United States Patent [19]
Hodgson

[11] Patent Number: 4,680,077
[45] Date of Patent: Jul. 14, 1987

[54] LAMINATING METHODS AND APPARATUS USING RESILIENT FACED ROLLERS

[75] Inventor: Thomas C. Hodgson, Auckland, New Zealand

[73] Assignee: Strong Plastics Limited, New Zealand

[21] Appl. No.: 747,140

[22] Filed: Jun. 20, 1985

[30] Foreign Application Priority Data

Jun. 25, 1984 [NZ] New Zealand .................. 208644

[51] Int. Cl.⁴ .............................................. C09J 5/06
[52] U.S. Cl. ..................................... 156/321; 29/132; 100/93 RP; 156/324; 156/498; 156/499; 156/555; 428/138
[58] Field of Search ..................... 29/132; 100/93 RP; 156/321, 324, 499, 555, 498; 428/138

[56] References Cited
U.S. PATENT DOCUMENTS 3,788,931 1/1974 Hynes ........................ 156/321 X
4,119,481 10/1978 Beckley ....................... 156/324 X

*Primary Examiner*—Robert A. Dawson
*Attorney, Agent, or Firm*—Nilsson, Robbins, Dalgarn, Berliner, Carson & Wurst

[57] ABSTRACT

An apparatus (10) for laminating plastics film(s) (12) to an element (14), for example wire netting. The apparatus (10) comprising a pair of resilient rollers (18 and 20) which presses the element (14) and plastics film(s) (12) together. Beforehand the plastics film(s) (12) passes a heating means (40) to reach a fusion temperature and an applicator (50) dispenses adhesive onto the element (14). A strong bond results between the plastics film(s) (12) and the element (14). A method is also described.

13 Claims, 2 Drawing Figures

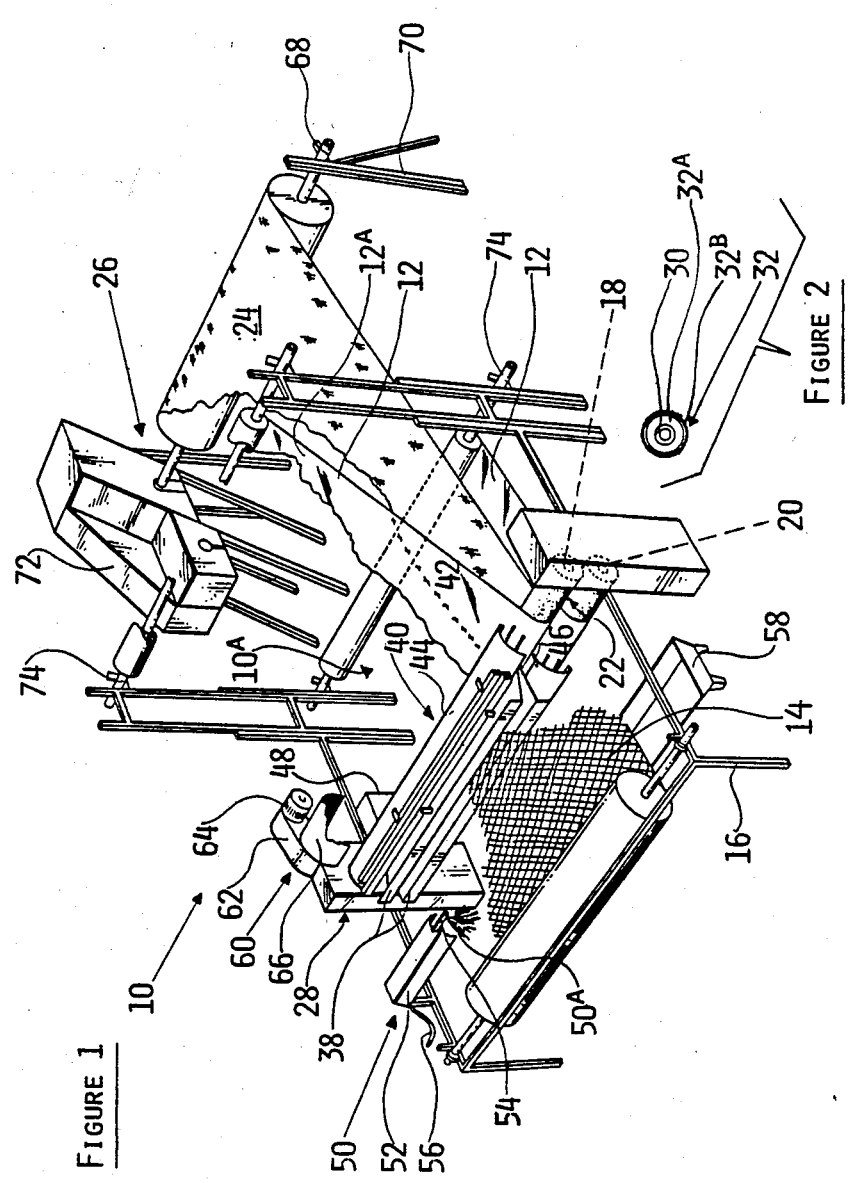

LAMINATING METHODS AND APPARATUS USING RESILIENT FACED ROLLERS

BACKGROUND OF THE INVENTION

This invention relates to methods of and apparatus for laminating one or more plastics films to a substantially planar element and in particular to a method of and apparatus for laminating two plastics films one each to a respective face of an element.

In our experience, many laminating methods and apparatus are limited to accepting only elements in sheet form and cannot accept filament elements, for example steel reinforcing mesh. Further, some laminating methods and apparatus do not sufficiently weld or adhere the plastic films to the element which can result in the in-situ ingress of air, water or other contaminants between the plastic films and the element.

An object of this invention is to provide a method of and an apparatus for laminating which will accept elements in sheet and filament form and which it is hoped will go some way toward overcoming the above problems.

BRIEF SUMMARY OF THE INVENTION

According to a first aspect of the invention there is provided an apparatus for laminating a plastics film to an element comprising a pair of nip gap forming rollers with the peripheral surface of at least one roller being covered with resilient material, means to feed a plastics film through the nip gap as to be in contact with the resilient material, heating means to heat the plastics film whereby at least a first surface thereof distal of the resilient material is substantially at a fusion temperature as the film enters the nip gap, means to feed an element through the nip gap whereby a treated surface thereof makes contact with the fused surface of the plastics film and applicator means to dispose an adhesive containing a wetting agent onto the element to thus form the treated surface thereof.

According to a second aspect of the invention there is provided a method of laminating a plastics film to an element comprising the steps of heating a first surface of the film to substantially a fusion temperature therefor, applying an adhesive containing a wetting agent to a surface of the element, introducing the plastics film and the element together with the adhesive covered surface of the element adjacent to the first surface of the plastics film with in so doing passing them between a pair of rollers arranged to form a nip gap therebetween and the peripheral surface of at least the roller corresponding to the plastic film being covered with resilient material.

BRIEF DESCRIPTION OF THE DRAWINGS

In further describing this invention, reference is made to the drawings of a preferred embodiment in which:

FIG. 1 is a partly schematic perspective view of a preferred laminating apparatus, and FIG. 2 is an end view of a roller of the preferred laminating apparatus.

DETAILED DESCRIPTION

The method and apparatus 10 of this invention are more particularly adapted for laminating plastics films 12, for example, polytetrafluoroethylene or "Teflon" (Trade Mark) in a range of thickness from 35 microns to 25 mm. The plastic films 12 are laminated one each to a respective surface of an element 14 such as metal sheet elements, asbestos and glass fibre mattings, various rigid and flexible filament materials, for example nettings and wire. It is envisaged that with laminating in accordance with this invention, the plastic films 12 will follow the contours of the element 14 and be fused together in any voids between filaments of the element 14.

A preferred laminating apparatus 10 comprises a support means, for example a suitable framework 16, for a supply of an element 14 disposed on a workpath 10a upstream of at least two rollers 18 and 20 disposed to form a nip gap 22 therebetween. Finished laminar product 24 take up means 26 is provided downstream of the rollers 18 and 20. The rollers 18 and 20 are supported on framework 16 at each end thereof for axial rotation. At least one roller 18 or 20 is connected to a suitable drive means 28 to act as a feed for plastics film 12 and element 14 through the nip gap 22. The peripheral surface of at least the roller 18 or 20 corresponding to the plastics film 12 preferably comprises a resilient material. Preferably each roller 18 and 20 comprises an inner rod 30 surrounded by a resilient material 32, for example a suitable rubber 32a, encased by a fibrous material 32b such as a natural wool fabricated into a mat form having projecting tufts of fibre. It has been found that natural wool fabricated into a mat form having projecting tufts provides best laminating results and suffers minimum burn damage. Each roller 18 and 20 is preferably six meters in length and at least 300 mm in diameter. Ends of the rod 30 project clear of the resilient material 32 and locate in bearings on framework 16 with common ends of the rods 30 at one end thereof engaging the drive means 28. The rollers 18 and 20 are preferably driven at a common end thereof by a common chain (not depicted) connected to a suitable variable speed electric motor. The rotational speed of the rollers is preferably from 0 to 36 revolutions a minute. The rollers 18 and 20 are supported preferably one roller 18 substantially above the other roller 20 in parallel relationship therewith. The nip gap 22 between the rollers 18 and 20 can be adjusted from, for example 0 mm to 600 mm by moving the upper roller 18 vertically. An automatic chain tensioner is preferably provided for the drive chain to maintain a suitable tension thereon, whatever the size of the nip gap 22. Suitable handguards 38 are provided adjacently upstream of the rollers 18 and 20 to help revent an operator's hands entering the nip gap 22. The spacing between the handguards 38 is adjustable to be commensurate to the nip gap 22. Plastics films 12 of various thicknesses can be laminated to different elements 14. Accordingly, different individual fusion temperatures for the plastics film 12 must be provided to attain a maximum bond between the plastics films 12 and the element 14. The variation of speed of rotation of rollers 18 and 20 provides the flexibility. The rollers 18 and 20 preferably provide the means for feeding plastics films 12 and the element 14 along the workpath 10a between the nip gap 22. However, it will be appreciated that alternative feed guide means can be provided.

It will be appreciated that further rollers may be provided downstream of the rollers 18 and 20 to help ensure that a bond has been effected between the plastics film 12 and the element 14.

Heating means 40 are disposed adjacently upstream of the laminating rollers 18 and 20 to heat the plastics films 12 whereby at least a first or fusion surface 12a thereof distal of the rollers 18 and 20 is substantially at a fusion temperature as the plastics film 12 enters the nip gap 22. The heating means 40 preferably comprises one or more quartz heaters 42 and an associated arcuate backing reflector 44 for each roller 18 and 20. The quartz heaters 42 and backing reflectors 44 preferably extend the length of each roller 18 and 20 and are disposed in parallel relationship thereto adjacent to the nip gap 22. Quartz heaters 42 are preferred as they provide an instant closed heat. However, it will be appreciated that alternative heating means 40 such as microwaves or ultrasonic sound waves can be used. The heating means 40 is preferably adjustably mounted to framework 16 so that the spacing and positioning of the heaters 42 and backing reflectors 44 with regard to the rollers 18 and 20 can be adjusted. A preferred angle of the backing reflectors 44 to the horizontal is 27° for the upper reflector 44 and 35° for the lower reflector 44. It has been found that the preferred heating means 40 provides for uniform heating of the plastics film 12 to a fusion temperature immediately prior to entry into the nip gap 22. The temperature of the heaters 42 is preferably constant. Variation of the temperature of the plastics films 12 is preferably achieved by changing the speed of rotation of the rollers 18 and 20 which alters the amount of time a section of the plastics films 12 is exposed to the heating means 40. It has been found that this allows greater incremental control of the temperature of the plastics film 12 than by altering the intensity of the heating means 40. One or more temperatures sensors 46 are provided to monitor the temperature of the fusion surface 12a of the plastics films 12. The sensors 46 are preferably mounted to the backing reflectors 44 and extend therefrom to adjacent the nip gap 22. The temperature sensors 46 are connected to signal control means 48 which regulates the rotational speed of the rollers 18 and 20 to enable the plastics film 12 to reach fusion temperature. For example, a suitable fusion temperature of a plastics film 12 of 250 microns thickness can be best achieved by rotating the rollers 18 and 20 at a speed of 14 revolutions a minute. The fusion temperature of the plastics film 12 and its thickness is programmed into the signal control means 48 which automatically selects the speed of rotation of the rollers 18 and 20. The temperature sensors 46 record the temperature of the plastics films 12 and increase or decrease the rotational speed of the rollers 18 and 20 when the temperature of the plastics films 12 is above or below respectively the required fusion temperature.

Applicator means 50 is provided to dispose an adhesive 50a containing a wetting agent onto the element 14. The applicator means 50 is provided preferably adjacently upstream of the heating means 40 and preferably comprises one or more of the spray devices 52. The spray device 52 preferably comprises a length of hollow tube 54 mounted within an inverted substantially trough shaped guard. Apertures are formed through a side of the tube 54 facing the element 14 through which adhesive 50a can be dispensed in the form of a mist. The adhesive applicator 50 is preferably connected by way of a suitable conduit 56 to an adhesive supply. An adhesive applicator 50 is preferably provided above and below the work path 10a through which an element 14 passes. A residue adhesive catchment 58 is preferably provided below the work path 10a through which an element 14 passes. An alternative applicator 50 may be in the form of an adhesive bath through which the element 14 can be trained. The adhesive 50a preferably contains a wetting agent which it is envisaged will facilitate in the cooling of the fused weld between plastics films 12 and will facilitate in spreading the adhesive 50a over the element 14 in a uniform film.

A finished laminar product cooling means 60 is provided downstream of the nip gap 22. The cooling means 60 preferably comprises a duct 62 incorporating an air blower 64 at an inlet thereof. An outlet 66 of the duct 62 is disposed across the work path 10a adjacently downstream of the laminating rollers 18 and 20 in parallel relationship thereto. It will be appreciated that an outlet 66 can be provided above and below the work path 10a.

Finished laminar product take-up rollers 68 (one only depicted) are preferably provided downstream of the laminating rollers 18 and 20. The rollers 68 are rotatably supported, for example, in bearings by a suitable framework 70 and driven by a suitable variable speed electric motor 72. The variable speed motor 72 is provided so that as the diameter of a roll of laminar product 24 increases, the rotational speed of the roller 68 decreases so that the take up speed of the laminar product 24 is commensurate to the feed in speed of the plastics films 12 and the element 14. The finished laminar product 24 can be wound for convenience of storage and transportation onto a roller 68. A plurality of rollers 68 are preferably provided so that the finished laminar product 24 can be continuously wound onto one roller and then another without interrupting a run. It is preferred that a cutting means (not depicted) is provided intermediate the laminating rollers 18 and 20 and the take-up rollers 68 so that the finished laminar product 24 can be cut to required lengths. Accordingly, a guillotine is preferably mounted in the work path 10a to provide a tranverse cut of the finished laminar product 24.

Plastics film 12 support means is provided downstream of the laminating rollers 18 and 19 on framework 16. The support means preferably comprises two rollers 74 disposed one above and the other below the work path 10a. A roll of plastics film 12 can be mounted to each roller 74, the free end of the plastics film 12 can then be trained about the associated laminating rollers 18 and 20 and passed through the nip gap 22 thereof. It will be appreciated that the rollers 74 can be provided upstream of the laminating rollers 18 and 20 so that rolls of plastics film 12 can be joined together by overlapping the ends thereof to enable the continuous running of the apparatus 10. Further a plurality of supplies of plastics films 12 and elements 14 can be provided upstream of the laminating rollers 18 and 20 and passed through the nip gap to provide a finished laminar product 24 comprising one, two, or three elements 14 between two, five or more plastic films 12.

In use, the appropriate fusion temperature of the plastics films 12 and their thickness is selected on the signal control means 48 which will automatically provide the required rotational speed of the rollers 18 and 20. One or more rolls of plastics films 12 can be mounted on the rollers 74. A free end of the plastics films 12 can be trained about an associated roller 18 and 20 and fed through the nip gap 22. The free end of one or more supplies of an element 14 can be fed through the nip gap 22. The laminating apparatus 10 can then be activated. The heating means 40 provides almost instant heat and heats the first surface 12a of the plastics films 12 to substantially a fusion temperature therefor. The applicator means 50 dispenses adhesive 50a on to both faces of the element 14. The laminating rollers 18 and 20 feed the plastics films 12 and element 14 into the nip gap 22 and presses them together. If the element 14 is comprised of filaments, then the plastics films 12 are fused part way about the surface of each filament and the two plastics films fuse together in any voids between the filaments. The temperature sensors 46 monitor the temperature of the fusion faces 12a of the plastics films 12 and provides input to the signal control means 48 to control the speed of rotation of the rollers 18 and 20. The free end of the finished laminar product 24 can be attached to a take-up roller 68 for convenience of storage of the finished laminar product 24. Should the element 14 be in rigid sheet form, the finished laminar product 24 can be cut to required lengths and stored on pellets for convenience of handling. As the laminar product passes the cooling means 60 from the nip gap 22 to the take-up roller 68, an air flow thereover from outlet 66 lowers the temperature of the laminar product 24.

I claim:

1. An apparatus for laminating a plastics film to a second element comprising a pair of nip gap forming rollers with the peripheral surfaces thereof being covered with natural wool fabricated into a mat form having projecting tufts of fibres, means to feed a plastics film through the nip gap as to be in contact with the natural wool covered surfaces of said rollers, heating means to heat the plastics film whereby at least a first surface thereof distal of the natural wool covered surfaces of said rollers is substantially at a fusion temperature as the film enters the nip gap, means to feed an element through the nip gap whereby a treated surface thereof makes contact with the fused surface of the plastics film and applicator means to dispense an adhesive containing a wetting agent onto the element to thus form the treated surface thereof.

2. An apparatus as claimed in claim 1 wherein at least one of the rollers is driven, the rotation thereof drawing the plastics film and element through the nip gap, temperature sensors to monitor the temperature of the first surface of the plastics film and signal control means regulating the rotational speed of the drive roller to correspond as required, to the fusion temperature.

3. An apparatus as claimed in claim 1 or 2 wherein more than one means to feed an associated plastics film are provided with at least a second of such means being disposed to the side of the element opposite the first such feed means, means to heat the plastics film associated with each additional plastics film feed means in a manner substantially the same as for the first plastics film to facilitate fusion to an element therebetween.

4. An apparatus as claimed in claim 1 or 2 or 3 wherein an air cooler is provided incorporating a duct having an inlet and an outlet disposed across the work path whereby a surface of the plastics film travelling past the outlet is at least partially cooled.

5. An apparatus as claimed in claim 1 or 2 or 3 or 4 wherein both rollers are driven to form the first and second plastics film feed means.

6. A method of laminating a plastics film to a metal network structure comprising the steps of heating a first surface of the film to substantially a fusion temperature therefor, applying an adhesive containing a wetting agent to a surface of said metal network structure, introducing the plastics film and said metal network structure together with the adhesive covered surface of said metal network structure adjacent to the first surface of the plastics film, with in so doing, passing them between a pair of rollers arranged to form a nip gap therebetween, the peripheral surface of at least the roller corresponding to the plastics film being covered with resilient material.

7. A method as claimed in claim 6 wherein two plastics films are laminated to said metal network structure sandwiched therebetween, the adhesive being applied to both faces of said metal network structure and the periphery of both rollers being covered with resilient material.

8. A method as claimed in claim 7 wherein said metal network structure is comprised of filaments, the plastic films being fused part way about the surface of each filament, the two plastics films being fused together in any voids between the filaments.

9. A method as claimed in claim 6 wherein the resilient material is natural wool fabricated into a mat form having projecting tufts of fibre.

10. A method of laminating a plastics film to an element comprising the steps of heating a first surface of the film to substantially a fusion temperature therefor, applying an adhesive containing a wetting agent to a surface of the element, introducing the plastics film and the element together with the adhesive covered surface of the element adjacent to the first surface of the plastics film, with in so doing, passing them between a pair of rollers arranged to form a nip gap therebetween, the peripheral surface of at least the roller corresponding to the plastics film being covered with natural wool fabricated into a mat form having projecting tufts of fibre.

11. A method as claimed in claim 10 wherein two plastics films are laminated to an element sandwiched therebetween, the adhesive being applied to both faces of the element and the periphery of both rollers being covered with resilient material.

12. A method as claimed in claim 11 wherein the element is comprised of filaments, the plastic films being fused part way about the surface of each filament, the two plastics films being fused together in any voids between the filaments.

13. A method as defined in claim 6 or 7 or 8 or 10 or 11 or 12 including the step of cooling the laminar product after passing through the nip gap.

* * * * *